No. 843,524. PATENTED FEB. 5, 1907.
H. L. DOHERTY.
PROCESS OF REVIVIFYING GAS PURIFYING MATERIALS.
APPLICATION FILED NOV. 12, 1906.
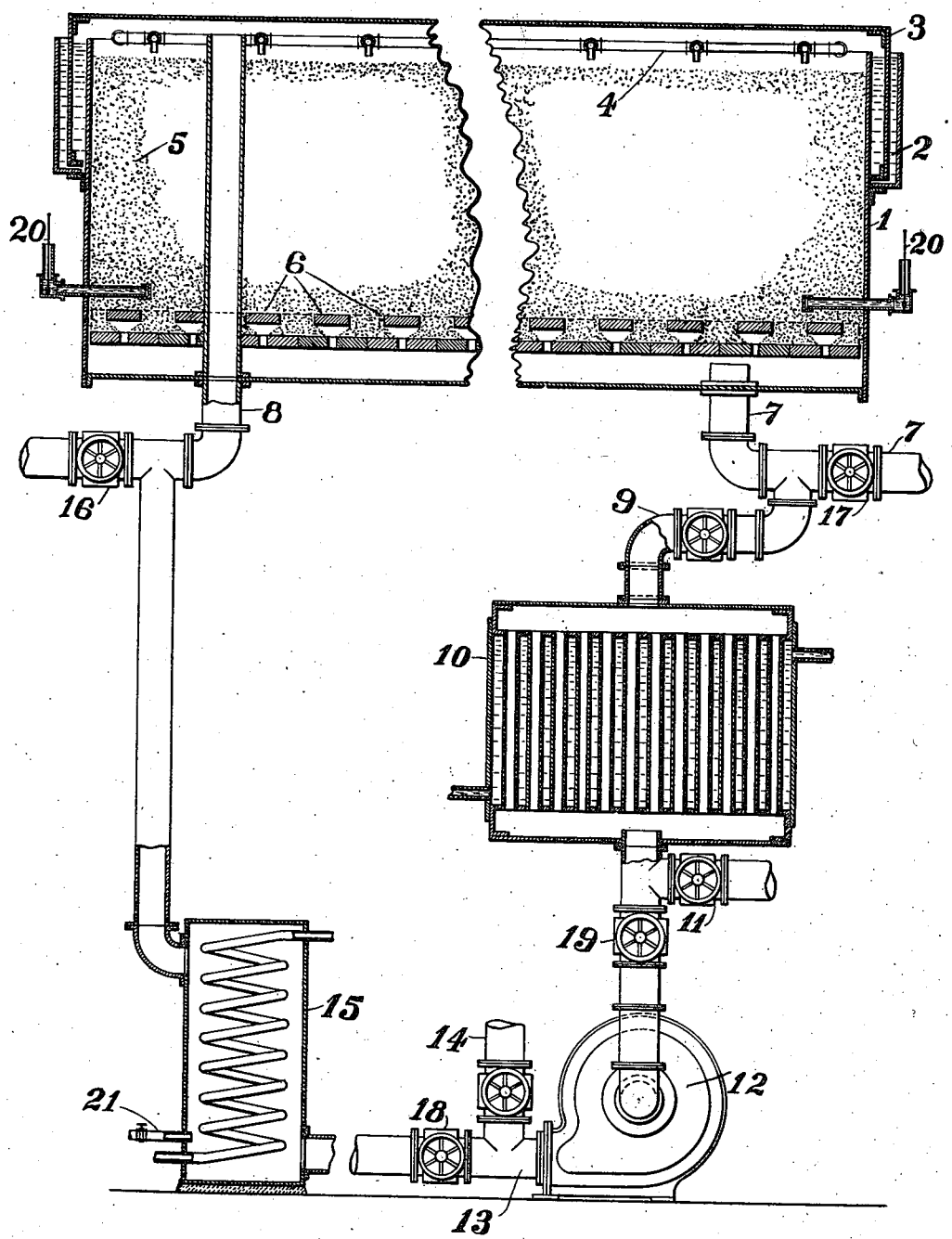
WITNESSES:
INVENTOR.
Henry L. Doherty
BY Marble & McElroy
ATTORNEYS

UNITED STATES PATENT OFFICE.

HENRY L. DOHERTY, OF MADISON, WISCONSIN.

PROCESS OF REVIVIFYING GAS-PURIFYING MATERIALS.

No. 843,524.  Specification of Letters Patent.  Patented Feb. 5, 1907.

Application filed November 12, 1906. Serial No. 343,054.

*To all whom it may concern:*

Be it known that I, HENRY L. DOHERTY, a citizen of the United States, residing at Madison, in the county of Dane and State of Wisconsin, have invented certain new and useful Improvements in Revivifying Purifying Materials; and I do hereby declare the following to be a full, clear, and exact description of the same, such as will enable others skilled in the art to which it appertains to make and use the same.

This invention relates to revivifying purifying materials, and consists in a method of regulably oxidizing and revivifying spent metallic oxids and salts used for the removal and recovery of sulfur from gases, oils, and other sulfur-bearing materials, all as more fully hereinafter set forth and claimed.

Many of the heavy metal oxids and their salts when contacted with sulfur-bearing gases and oils remove the sulfur, part of it generally being deposited as such and the remainder entering into combination with the metal to form sulfid. Lighting-gas, for instance, is generally freed from sulfur by the so-called "Laming's mixture," a mixture of iron oxid and sawdust, the sawdust merely serving to maintain porosity. Upon exposure to sulfur compounds of the type of hydrogen sulfid the oxygen of the oxid unites with the radical with which the sulfur is combined, part of the sulfur being deposited as such and the residue forming iron sulfid. Being formed at a low temperature in the presence of moisture, this sulfid is excessively oxidizable and on exposure to oxygen reforms the oxid with deposition of the sulfur existing in the form of sulfids as free sulfur if the operation be carefully performed. Many other heavy metal oxids may be used in lieu of iron oxid, as may their salts. Ferrous or cupric sulfate, for instance, takes up ammonia from gas to form ammonium sulfate, and then the residual oxids perform the described reaction, or with gas containing little or no ammonia the metallic salt may be mixed with base, such as lime, in the first place. With salts of such weak acids as boric and the like no base need be used. The advantage in using salts in this operation resides only in the fact that they furnish on decomposition at low temperatures hydrated oxids, which are much more reactive with sulfur compounds than oxids which have been exposed to high temperatures or are in "aged" forms, forms which have suffered intramolecular condensation. Such aged forms are readily produced with most oxids at temperatures not far removed from 100° centigrade. Copper hydrate, for instance, dehydrates and assumes an aged comparatively non-reactive form when placed in boiling water.

In freeing gas and petroleum from sulfur it is highly important that the metallic oxids employed be in as reactive a form as possible and that when recovered for reuse they be not exposed to high temperatures. Low-temperature recovery is also necessary, because the sulfur mixed with the oxid must not be allowed to melt and clog the pores of the reacting mass; but, as stated, the sulfids formed in the sulfur removal are themselves in a highly reactive condition and on exposure to air rapidly oxidize with development of high temperatures, the surface they expose to oxidation being almost infinite.

Removal of the spent oxids from the purifying-boxes and exposure to air in thin layers wet down at intervals accomplishes the result in a measure; but is a very offensive operation, because of the evolution of bad-smelling gases. Revival in the boxes is very apt to lead to undue temperatures. Attempts have been made to temper the air used for such revival with steam; but this of course means high temperatures.

In the present invention, diagrammatically illustrated in the accompanying drawing, which shows a diagrammatic partly-sectional elevation, I have devised a method of revivifying such spent oxids directly in the purifying-boxes by the use of air-currents of regulated composition and temperature, and in the accompanying illustration I have shown one type of apparatus of the many adapted to perform my process and accomplish my results.

In this apparatus, which, as shown, is more particularly adapted to holding and treating Laming's mixture for purifying gas, but may be also used for holding copper oxid and the like for treating sulfurous oil, 1 is a purifier-box, such as may be used for purifying gas, and is provided with a seal 2, cover 3, a water-introducing pipe or means 4, a layer or purifying oxids or material 5, and a false bottom 6 to support the same. In normal operation gas to be purified enters through pipe 7 and passes through the material 5 and out through pipe 8. In purifying the gas so passing through it the material 5 gradually becomes foul and loses its potency for the purpose and requires revivification, which is the purpose of this invention and the function of the apparatus now to be described. This apparatus consists, essentially, of a valved pipe 9, carrying a cooling device 10 and attached or connected to the inlet-pipe of the purifier. Below the cooler the pipe carries a valved outlet or inlet 11, opening to the atmosphere, and said pipe is also connected to the suction side of a fan 12, having a pipe 13, provided with another valved inlet or outlet 14 and also connected, through a heater 15, with the outlet-pipe 8 of the purifier. Suitable valves 16 and 17 in the outlet and inlet pipes 8 and 7 of the purifier allow it to be thrown out of circuit of gas to be purified and a circulatory motion of gases to be produced therein by the fan. Valves 18 and 19 allow this circulation to be controlled. Thermometers 20 are provided to ascertain the temperature in the purifying-box. In practice the same revivifying apparatus is usually connected by suitable pipes and valves to a number of purifying-boxes 1, such as shown, in such manner that any one of the purifying-boxes may be thrown out of service and connected to the revivifying apparatus and its purifying material revivified. Such pipe connections will be readily understood by those skilled in the art. They are omitted here for the sake of clearness and simplicity of illustration.

In use after connecting the revivifying apparatus operatively to a box 1 by closing valves 16 and 17 and opening valves 18 and 19 the residual gas remaining in the purifier is started into circulation by the fan, a minimal amount of air being allowed to mix therewith through valve 11 on the suction side of the fan and a little gas allowed to waste through 14. The circulating gas mass is thus an excessively dilute air. The oxygen of this air is absorbed to oxidize the sulfid and the temperature tends to rise, this tendency being restrained by use of the cooler. In each traverse of the circuit a little air is admitted and a little gas discharged. The discharged gas at first is mostly the residual gas left in the purifier at starting, but becomes nearly pure nitrogen a little later. The feed of air is of course inversely proportioned to the observed tendency to rise in temperature in the purifier. In order to prevent drying out of the mixture or dehydration of the oxids, water is admitted to the purifier in small amounts. Toward the end of the reaction, when the sulfids are nearly all oxidized, the reaction tends to slacken, and the proportion of air must be increased and the heater brought into function. The temperature in the purifier, however, should at no time be allowed to exceed 120° Fahrenheit with the ordinary Laming's mixture and is preferably kept at about 80° Fahrenheit.

Operating in the manner described the oxids are perfectly revivified at low temperature, retaining all their activity and having no chance to pass into aged comparatively little-reactive form. The mass retains its porosity, and no local overheating occurs to melt the sulfur or damage the oxids, nor is it necessary to remove the purifying material from the purifier-boxes until the accumulation of sulfur due to repeated use renders it necessary to extract said sulfur.

In practice the apparatus shown is of course connected to a plurality of purifiers, in which the purifying mass is to be used and recovered successively.

The particular purifying-box 1 illustrated is of my invention and forms the subject-matter of another application for Letters Patent, Serial No. 343,055, filed November 12, 1906. However, my invention is not restricted to the use of this particular or of any particular purifying-box. Hence I do not describe the particular box illustrated in detail.

I do not limit myself to any particular type of heater or cooler to be used in the apparatus for carrying out the above process. The particular cooler shown is one in which the gases pass through a series of pipes, around which cooling fluid is circulated; but any other suitable cooler may be used. The heater shown is one in which the gas circulates around pipe-coils through which heated fluid or gas is passed; but I may use any other type of heater—as, for example, one in which the heating is effected by blowing steam into the gases—and sometimes I may use both the heat-coils and a steam-inlet, as shown at 21.

What I claim is—

1. The process of recovering spent purifying oxids which consists in reoxidizing with a regulated current of air diluted with gases.

2. The process of recovering spent purifying oxids which consists in reoxidizing with a regulated current of air diluted with gases, the dilution being proportional to the observed tendency to rise in temperature.

3. The process of recovering spent purifying oxids which consists in circulating a gas mass through said oxids in closed circuit and progressively adding increasing amounts of air to said gas mass.

4. The process of recovering spent purifying oxids which consists in producing a closed circulation of an indifferent gas mass bathing said spent oxids, removing a portion of said gas at one point in the circulation and replacing it with a portion of air, and continuing the introduction of air and removal of excess gas until the oxidation of the spent oxids is complete.

5. The process of recovering spent oxids which consists in producing a closed circulation of an indifferent gas mass bathing said spent oxids and gradually replacing it with air, the introduction of air being inversely proportional to the observed tendency of the spent oxids to rise in temperature.

6. The process of recovering spent oxids which consists in producing a closed circulation of an indifferent gas mass bathing said spent oxids and gradually replacing it with air, the introduction of air being inversely proportional to the observed tendency of the spent oxids to rise in temperature, and developed heat being removed by a cooling device placed in the gas-circuit.

7. The process of recovering spent oxids which consists in reoxidizing said spent oxids with a cooled, diluted air-current.

8. The process of recovering spent oxids which consists in reoxidizing with a regulated current of cooled diluted air, the dilution being proportional to the observed tendency of the spent oxids to rise in temperature, and finally finishing the oxidation with warmed air.

9. The process of recovering spent oxids which consists in producing a closed circulation of an indifferent gas mass bathing said spent oxids, removing a portion of the gas at one point in the circuit and replacing it with a portion of air, the amount of air introduced being inversely proportional to the observed tendency of the spent oxids to rise in temperature, removing developed heat during the first stages of the oxidation by passing the circulating gas mass through a cooling device, and finally finishing the oxidation by a circulation of warmed, progressively-purer air.

10. The process of recovering spent oxids used in purifying gas which consists in reoxidizing said spent oxids in the purifier-box by a circulation of diluted air therethrough, the dilution being so proportioned as to prevent said spent oxids rising above 120° Fahrenheit.

11. The process of recovering spent oxids used in purifying gas which consists in producing a closed circulation of thermally-tempered, diluted air therethrough, the tempering and dilution being regulated to prevent said spent oxids rising above 120° Fahrenheit in temperature.

In testimony whereof I affix my signature in the presence of two witnesses.

HENRY L. DOHERTY.

Witnesses:
ROGERS H. LYON,
K. P. McELROY.